No. 826,437. PATENTED JULY 17, 1906.
J. G. MILLER.
COUPLING FOR CONDUIT PIPES.
APPLICATION FILED JUNE 21, 1905.

Witnesses:
Wm. P. Bond
Oscar W. Bond

Inventor:
Joseph G. Miller

UNITED STATES PATENT OFFICE.

JOSEPH G. MILLER, OF CHICAGO, ILLINOIS.

COUPLING FOR CONDUIT-PIPES.

No. 826,437.     Specification of Letters Patent.     Patented July 17, 1906.

Application filed June 21, 1905. Serial No. 266,278.

*To all whom it may concern:*

Be it known that I, JOSEPH G. MILLER, a citizen of the United States, residing at Chicago, in the county of Cook and State of Illinois, have invented a certain new and useful Improvement in Couplings for Conduit-Pipes, of which the following is a specification.

The coupling or connecting together of sections of pipe forming a conduit or tube for electric conductors and other uses in buildings is oftentimes attended with considerable trouble and expense, owing to want of space and the requirement that the joint shall be essentially moisture-proof, especially for conduits or tubes inclosing wires or conductors for electric currents in which it is a necessity that the conduit or tube shall be, in effect, a continuous one for stringing therein the wires or conductors.

The object of the present invention is to construct a coupling by the use of which the ends of adjoining pipe-sections of a conduit or tube will be brought together so as to furnish a close tight joint and a strong and firm connection at the joint, and this without requiring any great amount of space in which to make the coupling.

The invention consists in the features of construction and combinations of parts hereinafter described and claimed.

Figure 1:
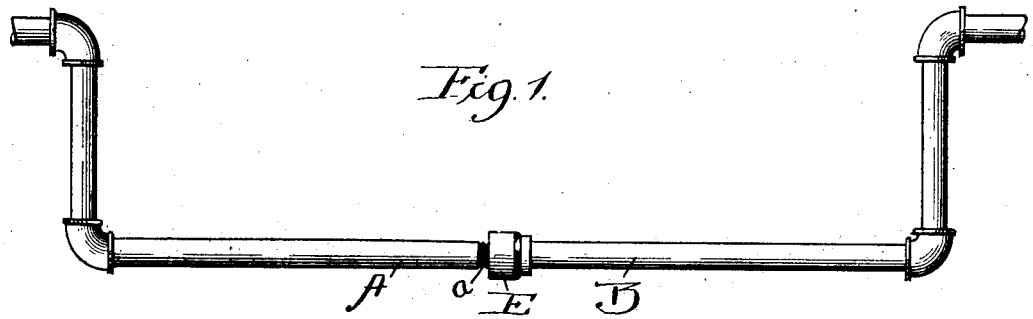
Figure 2:
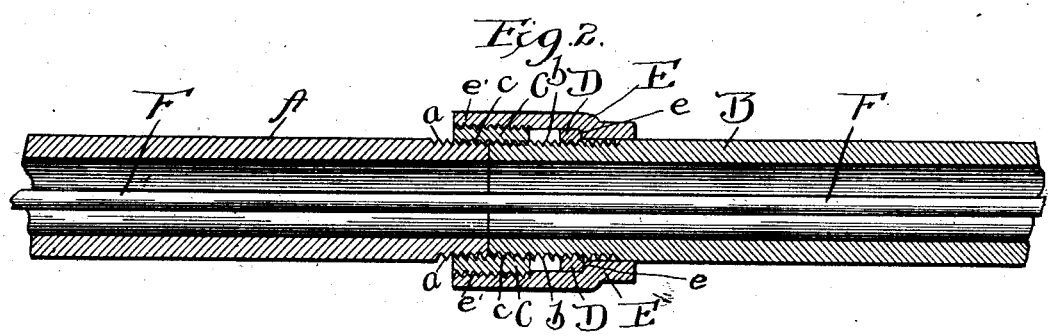
Figure 3:
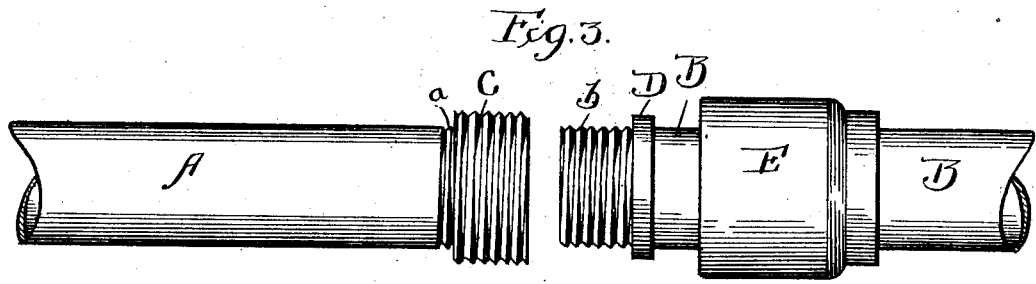
Figure 5:
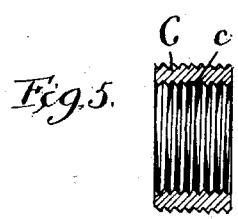
Figure 4:
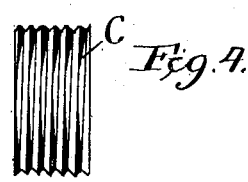
Figure 6:
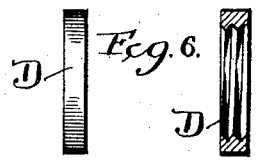
Figure 7:
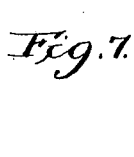

In the drawings illustrating the invention, Figure 1 is an elevation showing a conduit or tube formed of several sections of pipe with the adjoining ends of two sections of the pipe united by the coupling of the invention; Fig. 2, a longitudinal section showing the abutting ends of two adjoining sections of pipe drawn together and united by the coupling of the invention; Fig. 3, an elevation showing the ends of two sections of the pipe separated and the coupling-nut in a withdrawn position on one section of the pipe; Fig. 4, a side elevation of the connecting-collar; Fig. 5, a sectional elevation of said connecting-collar; Fig. 6, a side elevation of the adjustable ring-abutment, and Fig. 7 a sectional view of said adjustable ring-abutment.

The pipe A for one section of the conduit or tube has on its abutting end $a$ an exterior screw-thread for entering thereonto a connecting collar or ring. The pipe B of the companion section of the conduit or tube has on its abutting end $b$ an exterior screw-thread, which extends on the surface of the end a greater distance than does the screw-thread on the end $a$ of the pipe A, and the increased length of screw-thread on the end $b$ of the pipe B is for a purpose hereinafter described.

A collar or ring C has a screw-thread on its interior face $c$, which screw-thread matches with the screw-thread on the exterior of the end $a$, so that the collar or ring C can be threaded firmly onto the end of the tube A, and when in position projects beyond the abutting end $a$ of the pipe, as shown in Fig. 2. The collar or ring C projects beyond the end $a$ of the pipe A a sufficient distance for firmly threading thereinto the abutting end $b$ of the pipe B, so that the end faces of the adjacent ends $a$ and $b$ of the pipes A and B will fit closely together and abut one against the other for the collar or ring C to closely encircle the abutting ends $a$ and $b$ and firmly hold the ends of the pipes A and B at the joint.

The end $b$ of the pipe B has entered on its screw-thread an abutment or ring D, for which purpose the interior of the abutment or ring D has a screw-thread fitting the exterior screw-thread on the end $b$ of the pipe B, so that the abutment or ring can be advanced and receded on the end $b$ and be made to occupy an adjusted position on the end by which it will furnish a shoulder which will serve as a stop against which a drawing force can be exerted by which the abutting ends $a$ and $b$ of the pipe-sections A and B will be forced into a close engagement, thereby preventing moisture from entering the interior of the conduit at the joint of the two sections or divisions of the conduit.

The collar or ring C on its exterior face has a screw-thread, and the exterior face of the abutment or ring D is left smooth or plain. A coupling-nut E completes the joint between the two pipes A and B of the conduit sections or divisions. This coupling-nut E has an enlarged body $e'$, with a screw-thread on its interior face to engage the screw-thread on the exterior face of the collar or ring C, so that the coupling-nut can be advanced and receded by means of the screw-threads. The chamber of the coupling-nut terminates in a straight face, forming an abutment or shoulder $e$ for engagement with the end face of the abutment or ring D as the coupling-nut is advanced on the collar or ring C, and this engagement of the shoulder or abutment $e$ with the abutment or ring D serves to advance the pipes A and B toward each other at their adjoining ends, bringing the abutting faces of the pipes into close engagement one with the other.

The abutment or ring D is set or adjusted on the end *b* at a point where the abutment or shoulder *e* of the coupling-nut will engage the end face of the abutment or ring D before the coupling has reached the limit of its advance position, so that with the turning of the coupling-nut to its advanced position, or approximately so, the abutment or shoulder *e* will by its engagement with the abutment or ring D draw the pipes A and B together for the abutting ends *a* and *b* to impinge and form a tight joint for the exclusion of moisture.

In use the collar or ring C is threaded onto the end *a* of the pipe A to the limit of the screw-threads on the end *a* of the pipe. The coupling-nut E is slipped onto the end of the pipe B in the receded position. (Shown in Fig. 3.) The abutment-ring or adjustable collar D is threaded onto the end *b* of the pipe B and is set or adjusted on the end *b* at the point where it will be engaged by the shoulder *e* of the coupling-nut and by such engagement draw closely together the abutting ends of the pipes A and B with the advance of the coupling-nut. The end *b* of the pipe B after the abutment-ring or adjustable collar D has been set in position is threaded into the end of the collar or ring C until the abutting faces of the ends *a* and *b* are in contact, thus uniting the ends of the pipes A and B at the joint by the connecting collar or ring C, which encircles the ends of both pipes. The coupling-nut E is advanced for the screw-thread on its interior face to engage the screw-thread on the exterior face of the connecting collar or ring C, and such advance of the coupling-nut continues until the shoulder *e* engages with the abutment-ring or adjustable collar D for a further advance of the coupling-nut to force the abutting faces of the ends *a* and *b* firmly and closely together.

It will be seen that the joint between the pipes A and B is strengthened and closed by the connecting collar or ring C and that the joint is further strengthened and more effectively and tightly closed by the coupling-nut E and the abutment-ring or adjustable collar D when the coupling-nut is advanced to a point where the shoulder *e* and the abutment or collar D will engage and force the abutting end faces of the pipe-sections one against the other. The connecting collar or ring C and the coupling-nut E, in conjunction with the ring or collar D, constitute a coupling as a whole by means of which the joint between the two pipes is rendered firm and strong and at the same time is made moisture-proof, so that both a strong and firm joint and a moisture-proof joint is obtained.

It will be seen that the coupling occupies but little space and can be made readily and quickly, and when made the conduit or tube is, in effect, a continuous one and the wires or conductors therein are effectively protected from the effects of moisture and other influences at the joint. The joint, in fact, has a double support, one support by means of the connecting collar or ring C and the other support by means of the coupling-nut, and in this manner a joint which is solid, rigid, and close is obtained and by which a continuous connection is furnished between the two pipes at their abutting ends, making the conduit or tube continuous at the joint.

I claim—

1. In a conduit-pipe coupling, the combination of two meeting pipes each having on its abutting end an exterior screw-thread and having the screw-threaded portion on one abutting end of greater length than the screw-threaded portion of the companion abutting end, a connecting-collar having both an interior and exterior screw-thread and receiving thereinto the screw-threaded abutting ends of the two pipes, an adjustable abutment-ring on the abutting end of the pipe having the longer exterior screw-thread, and a coupling-nut slidably mounted on the end of the pipe having the longer screw-thread, the coupling-nut having a shoulder for engagement with the abutment-ring and having an interior screw-thread to coact with the exterior screw-thread of the connecting-collar for tightly forcing together at the joint the end faces of the two pipes, substantially as described.

2. In a conduit-pipe coupling, the combination of two meeting pipes, one pipe having on its abutting end a collar permanent therewith and the collar having an interior and exterior screw-thread and receiving the abutting end of the companion pipe in its interior screw-thread, an adjustable ring on the end of the entered pipe, and a coupling-nut surrounding the ring and having a shoulder for engagement with the ring and having an interior screw-thread to coact with the exterior screw-thread of the collar for tightly forcing together the end faces of the two pipes, substantially as described.

3. A conduit-pipe coupling adapted for connecting together and tightly closing the meeting ends of two pipes, and consisting of a receiving-collar common to the ends of both pipes, an adjustable abutment on the meeting end of one pipe, and a coupling-nut encircling the abutment and coacting with the collar and having an abutment engaging the adjustable abutment and serving to draw the meeting ends of the two pipes in close contact, substantially as described.

JOSEPH G. MILLER.

Witnesses:
WALKER BANNING,
FRANCES M. FROST